United States Patent [19]
Sato et al.

[11] Patent Number: 5,500,731
[45] Date of Patent: Mar. 19, 1996

[54] OPTICAL TIME DOMAIN REFLECTOMETER USING RING LASER LIGHT SOURCE

[75] Inventors: Mitsuhisa Sato; Mikio Maeda, both of Tokyo; Shinichi Furukawa, Mito, all of Japan

[73] Assignees: Ando Electric Co., Ltd.; Nippon Telegraph and Telephone Corporation, both of Tokyo, Japan

[21] Appl. No.: 330,801

[22] Filed: Oct. 28, 1994

[30] Foreign Application Priority Data

Oct. 29, 1993 [JP] Japan .................... 5-272678

[51] Int. Cl.[6] .............................. G01N 21/84; G01J 5/08
[52] U.S. Cl. ................................. 356/73.1; 356/44
[58] Field of Search ......................... 356/73.1, 44

[56] References Cited

FOREIGN PATENT DOCUMENTS 3-120437  5/1991  Japan ................... 356/73.1
2248990   4/1992  United Kingdom ........ 356/73.1

*Primary Examiner*—Vincent P. McGraw
*Attorney, Agent, or Firm*—Finnegan, Henderson, Farabow, Garrett & Dunner

[57] ABSTRACT

The purpose of the present invention is to provide a time domain reflectometer in which the system cost is low and the dynamic range is wide. In accordance with the present invention, an excitation light source for generating continuous light of a predetermined frequency (e. g., 1.48 μm), and a ring laser part for generating a high power light pulse in accordance with the continuous light are provided. A light branch device is held in common by the ring laser part and a measurement part. The light branch device makes the light pulse which has been incident on one of its end parts to be incident on a light cable to be measured; and the light branch device also receives response light and supplies the response light to a light receptor in the measurement part. In the measurement part, the response light is converted to a corresponding electric signal and the signal is amplified to be supplied to a measurement circuit.

3 Claims, 3 Drawing Sheets

OPTICAL TIME DOMAIN REFLECTOMETER USING RING LASER LIGHT SOURCE

BACKGROUND OF THE INVENTION

1. Field of the Invention

The present invention relates to an optical time domain reflectometer which is especially suitable for optical communication.

2. Background Art

Up until now, OTDR (Optical Time Domain Reflectometry) has been developed for detecting breaking points or loss of connection or the like in laid optical cables. By this OTDR, the position of a breaking point or loss of connection and the like is detected in a manner such that a high power optical pulse is incident on an input end of the laid optical cable, and a crest value and arrival time of the response light, which has been returned to the input end by back-scattering or reflection, are measured.

FIG. 2 shows an example of the optical time domain reflectometer to conduct the detection by the OTDR described above. In the figure, reference numeral 1 indicates a high power light source generating a light pulse, the repeating frequency of light pulses generated by light source 1 being set in accordance with the accuracy of the measurement distance. Reference numeral 2 indicates a light branch device which makes the light pulse, which has been inputted from the high power light source 1 to an input end 2a, to be incident on an end portion 3a of an optical cable 3 to be measured. The light branch device also outputs response light reflected from the cable 3 to an output end 2b. In addition, cable 3 to be measured is a bundle of optical fibers, each of which has been elongated by connecting a number of optical fibers together. Reference numeral 4 indicates a light receptor which converts the response light from the output end 2b of the light branch device 2 to an electric signal and supplies the electric signal to an amplifier 5.

In this arrangement, when high power light source 1 generates a high power light pulse, the light pulse is incident on the end portion 3a of cable 3 to be measured via light branch device 2. Response light which has been returned to the end portion 3a by back-scattering or reflection in the cable 3 is supplied to light receptor 4 via the light branch device. In light receptor 4, the response light is converted into a corresponding electric signal which is subsequently amplified by amplifier 5 and supplied to measurement circuit 20. The measurement circuit 20 conducts the detection as described above in accordance with the supplied electric signal.

In addition, the above-mentioned optical time domain reflectometer is also used for optical communication in which a very long optical cable is used. Therefore, it is necessary to enlarge a possible range of the level of the response light to be measured (referred to as a "dynamic range", hereinbelow). Until now, developmental efforts for increasing the power of the light source or sensitivity of the light receptor, or decreasing the loss related to the insertion of each optical circuit and the like have been made for enlarging the dynamic range. In recent years, it has been believed that a ring laser apparatus 6, whose approximate arrangement is shown in FIG. 3, may be used for a higher power light source.

In the ring laser apparatus 6 of FIG. 3, reference numeral 7 indicates a excitation light source which generates continuous light having a specified wavelength (e. g., 1.48 μm). Reference numeral 8 indicates an optical synthesizer which synthesizes the continuous light inputted from the excitation light source 7 to the input end 8b and the continuous light supplied to the input end 8a via optical switch 11 which receives the continuous light and generates a light pulse by changing its state.

Optical fiber 9 is doped with, for example, one of the rare earth elements such as erbium (Er); thus, erbium ions ($Er^{3+}$) are distributed in the cable. When the continuous light is incident from excitation light source 7 on the input end of the optical fiber 9 via optical synthesizer 8, the optical fiber 9 is excited. Reference numeral 10 is a light branch device which directs the supplied optical pulse to switch 11 or its output end for an optical cable to be measured.

By the apparatus described above, when continuous light is generated from the excitation light source 7, optical fiber 9 is excited. At this time, switch 11 is set "on", and a closed loop is formed; thus, the continuous light is amplified. Then, if switch 11 conducts an on/of operation, a light pulse is generated, and after that, if switch 11 is set "on", the light pulse is amplified in the closed loop. Therefore, the crest value of the light pulse outputted from the output end of the light branch device 10 is very large. In addition, details of the ring laser apparatus 6 are disclosed in the specification of Japanese Patent Application, Laid Open First Publication No. Hei 05-21880 which the present applicant formerly filed.

However, if ring laser apparatus 6 is used in the above-mentioned conventional optical time domain reflectometer, it is necessary to use two light branch devices 2 and 10; this raises the system cost. In addition, these light branch devices 2 and 10 are inserted in the path of the light pulse, and the loss of the insertion is thereby large. Accordingly, there has been a problem that the dynamic range of the OTDR cannot be enlarged to the degree anticipated.

SUMMARY OF THE INVENTION

It is accordingly an object of the present invention to provide an optical time domain reflectometer in which the system cost is low and the dynamic range is wide.

Therefore, the present invention provides an optical time domain reflectometer wherein a light pulse is incident on an input end of an optical cable, and response light corresponding to back-scattering or reflection in the optical cable is detected at the input end, the optical time domain reflectometer comprising: an excitation light source for generating continuous light having a predetermined frequency; a light pulse generator comprising a closed loop light path and a switch inserted into the light path, the closed loop light path for receiving the continuous light from the excitation light source and amplifying the continuous light, the light pulse generator for generating and amplifying the light pulse by controlling the on/off state of the switch; a light receptor for receiving the response light; and a light branch device inserted into the closed loop light path, for making the amplified light pulse to be incident on the input end of the optical cable and also for receiving the response light and making the response light to be incident on the light receptor.

According to the optical time domain reflectometer described above, when the excitation light source generates continuous light having a predetermined frequency, the continuous light is amplified in the closed loop light path. Then, a light pulse is generated by the light pulse generator which controls the on/off state of the switch. Then, the light branch device inserted into the light path makes the light pulse to be incident on the input end of the optical cable; and the light branch device also makes the response light outputted from the input end of the optical cable to be incident on the light receptor.

As described above, only one light branch device is needed in the optical time domain reflectometer; thus the system cost can be lowered and the loss due to the insertion can be reduced. In addition, the crest value of the light pulse which is incident on the optical cable is large; thus, a wide dynamic range of the response light can be obtained.

DESCRIPTION OF PREFERRED EMBODIMENTS

Figure 1:
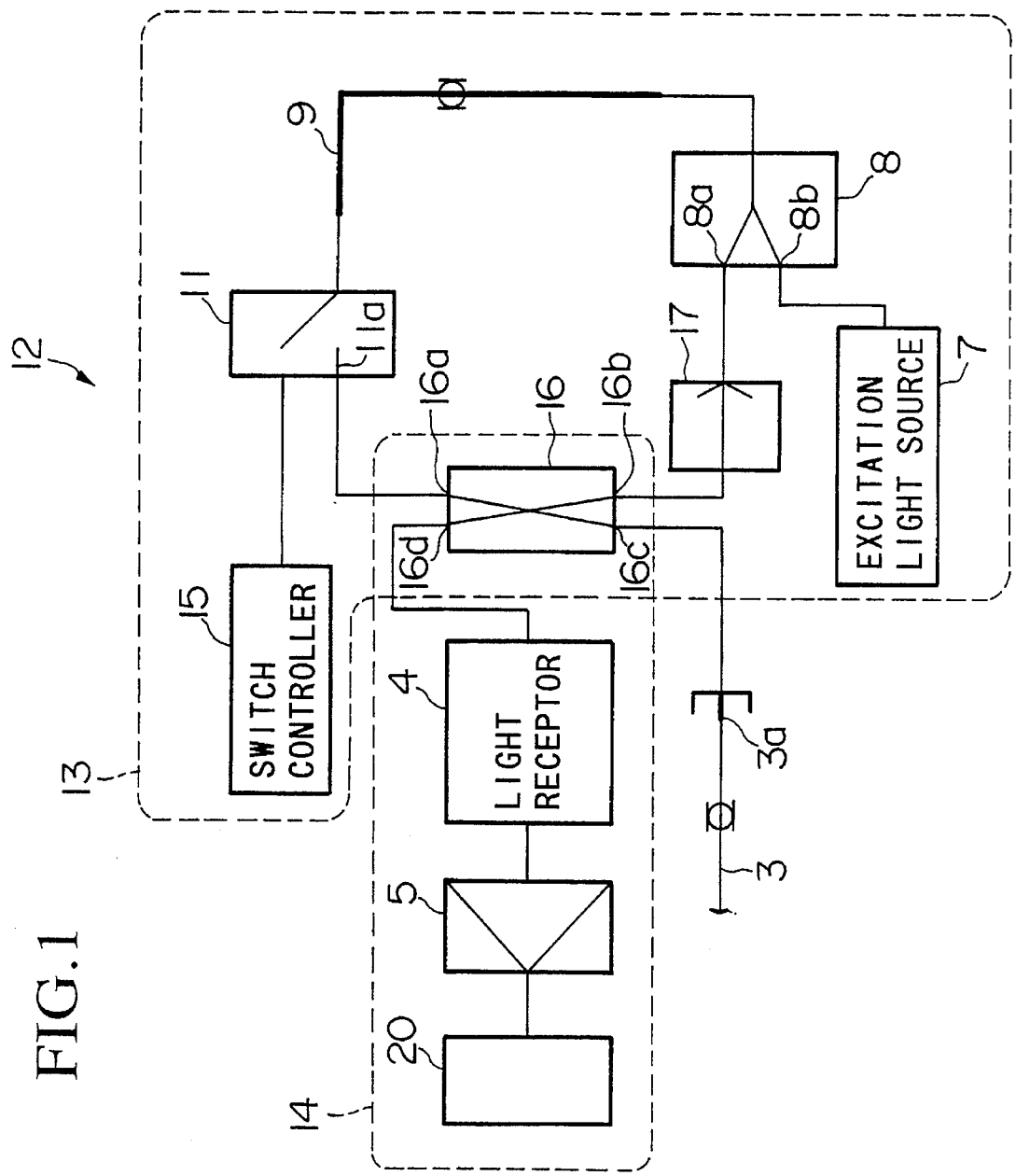
FIG. 1 is a block diagram showing a structural outline of the optical time domain reflectometer according to an embodiment of the present invention.
Figure 2:
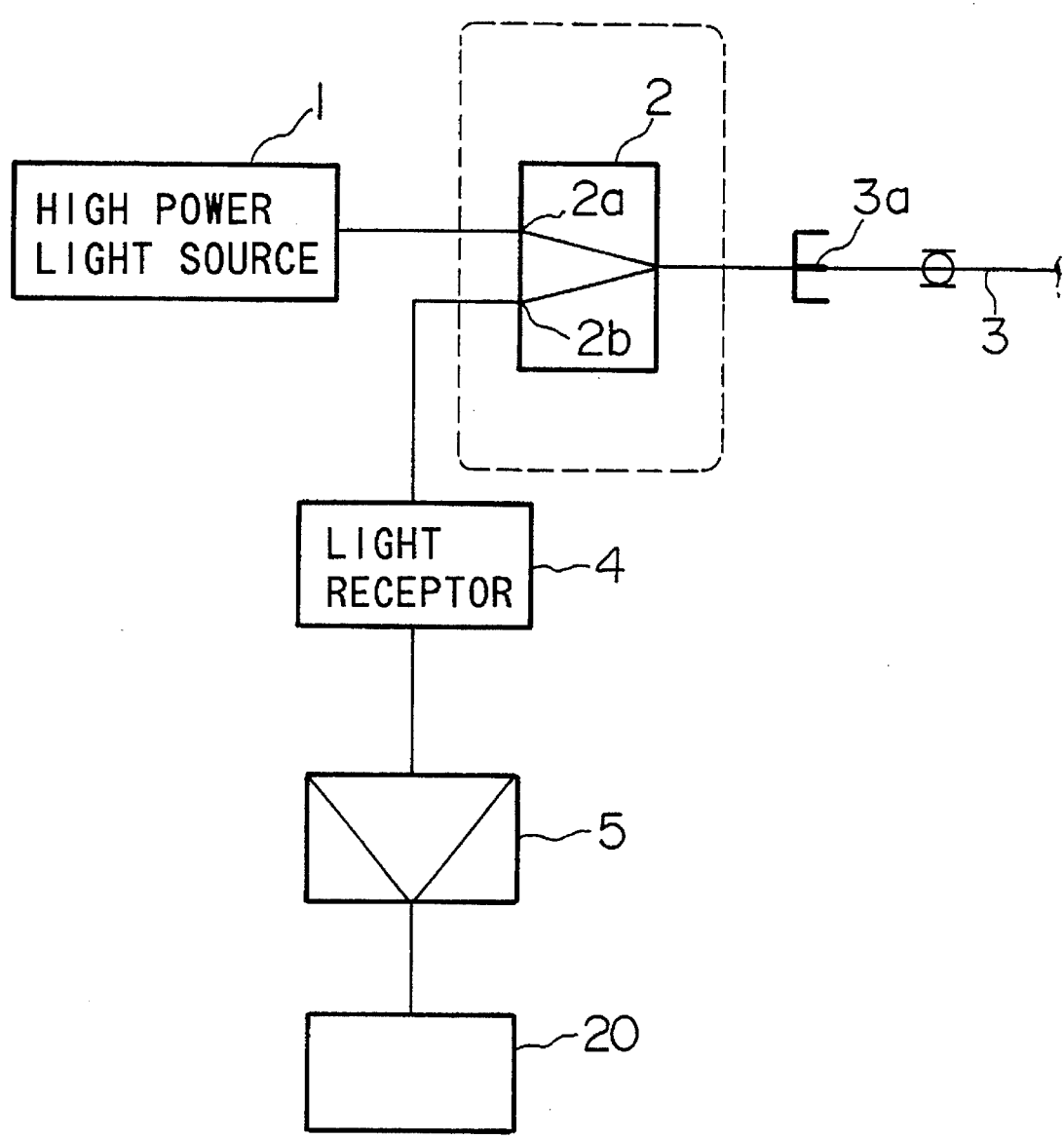
FIG. 2 is a block diagram showing the configuration of a conventional optical time domain reflectometer.
Figure 3:
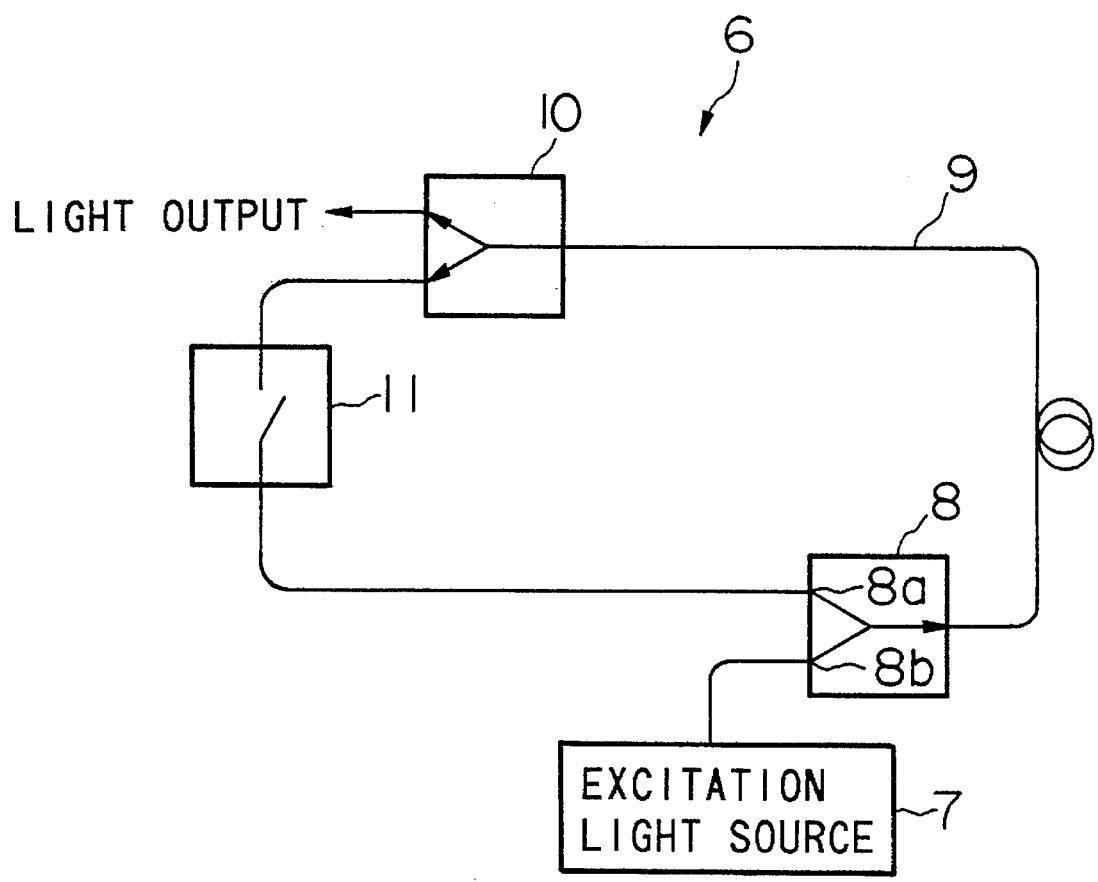
FIG. 3 is a block diagram showing the configuration of the ring laser apparatus used in the conventional optical time domain reflectometer.

Hereinbelow, an embodiment of the present invention will be explained with reference to the drawings. FIG. 1 is a block diagram showing a structural outline of the time domain reflectometer 12 according to an embodiment of the present invention. In this figure, parts which are identical to those shown in FIGS. 2 and 3 are given identical reference numerals, and an explanation thereof will be omitted here.

The feature of the optical time domain reflectometer 12 in FIG. 1 is that the part corresponding to light branch device 2 (in FIG. 2) and the part corresponding to light branch device 10 (in FIG. 3) are joined into one part.

In FIG. 1, reference numeral 13 indicates a ring laser part for generating a high power light pulse and making the light pulse to be incident on end part 3a of optical cable 3 to be measured. Reference numeral 14 indicates a measurement part for measuring a crest value and an arrival time of response light outputted from the end part 3a; and detecting a position of a breaking point and loss of connection in cable 3. That is, optical time domain reflectometer 12 is constructed by the ring laser part 13 and the measurement part 14.

In the above-mentioned ring laser part 13, reference numeral 15 indicates a switch controller which controls on/off conditions of optical switch 11 at specified periods. Reference numeral 16 indicates a light branch device for outputting the optical pulse from end part 16b or 16c, the pulse having been incident from output end 11a of the optical switch 11 on end part 16a. Reference numeral 17 indicates a isolator inserted between the end part 16b of light branch device 16 and input end 8a of synthesizer 8, the isolator disconnecting light which has the opposite direction and becomes an obstacle for the amplification of the light pulse.

Furthermore, the light branch device 16 is also a structural element of measurement part 14. In the measurement part 14, the light branch device receives response light which has been incident from its end part 16c and outputs the response light from end part 16d. This response light is then converted to an electric signal in light receptor 4; and the electric signal is amplified in amplifier 5 to be supplied to a measurement circuit 20. The measurement circuit 20 measures transmission characteristics of cable 3 related to, for instance, breaking of the cable or loss of the connection.

In addition, switch 11 is a A/O (Acousto-Optical) switch or a Q-switch using an optical chopper.

Hereinbelow, the operation of the optical time domain reflectometer 12 will be explained.

First, excitation light source 7 generates continuous light of a predetermined wavelength (for example, 1.48 μm). The continuous light is incident on the input end of optical fiber 9 via optical synthesizer 8. The state of optical fiber thereby becomes an excitation state; thus, if switch 11 is set "on", continuous light is amplified. At this time, if switch controller 15 starts to control the on/off state of the switch, a light pulse is outputted from the output end of optical fiber 9.

The light pulse from the output end of optical fiber 9 is incident on end part 16a of light branch device 16 via output end 11a of optical switch 11 and is subsequently outputted from the end part 16b of the light branch device 16. This light pulse is incident on input end 8a of optical synthesizer 8 via isolator 17 and then is combined with the continuous light, which has been incident on input end 8b, to be again incident on the input end of optical fiber 9. Then, the amplified light pulse is outputted from the end part 16c of the light branch device 16 to be incident on the end part 3a of optical fiber 3 to be measured.

In the optical fiber 3, the light pulse has back-scattering or reflection corresponding to conditions in the cable. Thus, response light corresponding to the back-scattering or the reflection is incident from end part 3a of cable 3 on end part 16c of light branch device 16 to be outputted from end part 16d of the light branch device.

The response light outputted from the end part 16d is converted to a corresponding electric signal in light receptor 4. The electric signal is amplified in amplifier 5 to be supplied to measurement circuit 20. In the measurement circuit 20, the position of the breaking point and the loss of the connection in optical cable 3 to be measured are detected.

Furthermore, on the path from the generation of the light pulse in ring laser part 13 to the reception of the light pulse by light receptor 4, only one light branch device 16 is inserted; thus, the loss due to the insertion is quite low.

For example, referring to light branch devices 2 and 10 in FIGS. 2 and 3, if the difference between a level of the inputted light pulse and a level of the outputted light pulse (i.e., the loss of the insertion) for one directional case of each light branch device is assumed to be 3 dB; the total loss of the insertion in the path of the light pulse in the conventional optical time domain reflectometer is thus 9 dB. In contrast, in optical time domain reflectometer 12 in FIG. 12, if the loss due to the insertion of light branch device 16 is assumed to be 3 dB as in the above, the loss due to the insertion at the path is 6 dB.

As described above, the optical time domain reflectometer 12 of the present embodiment is constructed in a manner such that the light branch device 16 is held in common by ring laser part 13 and measurement part 14; therefore, the loss of the insertion of the path of the light pulse is reduced (for example, 3 dB) and a wide dynamic range is obtained. Moreover, only one light branch device is provided in the circuit of the apparatus; thus the system cost is lowered.

In addition, the loss of the transmission in the optical cable 3 to be measured is detected in the above-mentioned embodiment; however, temperature distribution around the optical fiber 3 may also be measured.

What is claimed is:

1. An optical time domain reflectometer wherein a light pulse is incident on an input end of an optical cable, and response light corresponding to back-scattering or reflection in the optical cable is detected at the input end, the optical time domain reflectometer comprising:

an excitation light source for generating continuous light having a predetermined frequency;

a light pulse generator comprising a closed loop light path and a switch inserted into the light path, the closed loop light path for receiving the continuous light from the excitation light source and amplifying the continuous light, the light pulse generator for generating and amplifying the light pulse by controlling the on/off state of the switch;

a light receptor for receiving the response light; and a light branch device inserted into the closed loop light path, for making the amplified light pulse to be incident on the input end of the optical cable and also for receiving the response light and making the response light to be incident on the light receptor.

2. An optical time domain reflectometer as claimed in claim 1, for measuring loss of transmission of the optical cable.

3. An optical time domain reflectometer as claimed in claim 1, for measuring temperature distribution around the optical cable.

* * * * *

UNITED STATES PATENT AND TRADEMARK OFFICE
CERTIFICATE OF CORRECTION

PATENT NO. : 5,500,731
DATED : March 19, 1996
INVENTOR(S) : Mituhisa SATO et al.

It is certified that error appears in the above-indentified patent and that said Letters Patent is hereby corrected as shown below:

On the title page, item [75], change "Mitsuhisa" to -- Mituhisa --.

Signed and Sealed this

Twenty-ninth Day of October 1996

Attest:

BRUCE LEHMAN

*Attesting Officer*  *Commissioner of Patents and Trademarks*